April 19, 1932. R. E. SWANFELT 1,854,431
LEVELER AND PULVERIZER
Filed Oct. 8, 1930
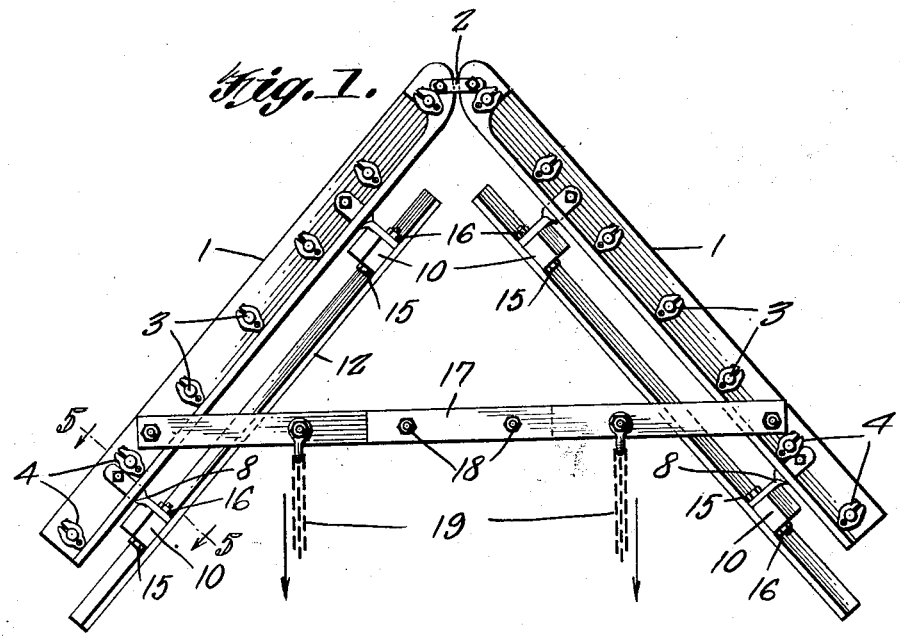
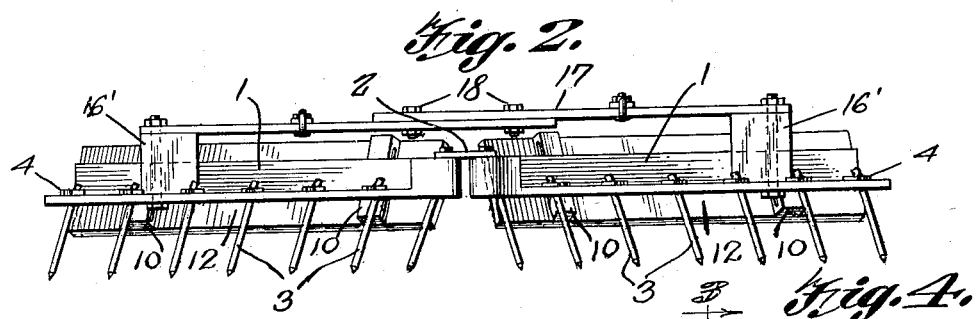
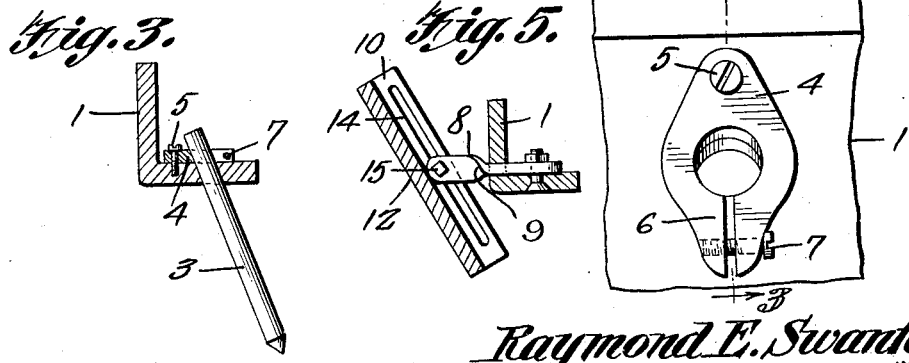
Raymond E. Swanfelt,
INVENTOR
BY Victor J. Evans
ATTORNEY
WITNESS: P. J. Hickey Patented Apr. 19, 1932

1,854,431

UNITED STATES PATENT OFFICE

RAYMOND E. SWANFELT, OF PAXTON, ILLINOIS

LEVELER AND PULVERIZER

Application filed October 8, 1930. Serial No. 487,284.

My present invention has reference to a leveler and pulverizer to be employed in preparing ground that is plowed for crops and my object is the provision of a device for this purpose which is hitched to a disc cultivator and which will act on the ground to render the same smooth, free and clear of ridges or hollows made by the disc and likewise to effectively pulverize the soil.

A further object is the provision of a device for this purpose which is so constructed as to leave the ground smooth yet pulverized to avoid the packing of the earth by rain.

A still further object is the provision of an implement for this purpose which may be adjusted as to width and which may be hitched to a tractor disc or which may be drawn by draft animals.

A further object is the proviison of a device for this purpose which is characterized by cheapness in manufacture and thorough efficiency in practical use.

To the attainment of the foregoing the invention consists in the improvement hereinafter described and definitely claimed.

In the drawings:

Figure 1 is a plan view of an implement in accordance with this invention.

Figure 2 is a rear elevation thereof.

Figure 3 is a detail sectional view approximately on the line 3—3 of Figure 4.

Figure 4 is a plan view of Figure 3.

Figure 5 is a detail sectional view approximately on the line 5—5 of Figure 1.

The tooth carrying members of the improved implement are in the nature of angle irons and as each is of a similar construction they are indicated in the drawings by the numeral 1. The rear ends of the angle irons 1 are pivotally connected together by a link 2, so that the confronting ends of the said members are spaced a slight distance away from each other. The horizontal flanges of the angle members 1, at points equidistant throughout the length thereof are provided with openings which have outwardly flared bores, and through each of these inclined bores there is passed a cross sectionally round tooth or pin 3. The teeth are held angularly on the members 1 in adjusted position through the medium of clamping discs or washers 4 which have extended ends, one of which being pivotally secured to the horizontal flange of the angle members 1 by the bolt 5 and the other end being slitted. The bores of the discs are arranged at the same inclination as those of the openings in the members 1 and aline with such openings. There is passed through the arms 6 provided by the slit in the disc 4 a binding bolt or screw 7 which forces the divided or slit portions of the disc toward each other and tightly binds upon the teeth 3 for effectively sustaining the same adjusted on the angle plates 1. The vertical flanges of the members 1 in a line with the horizontal flanges thereof have spaced openings therethrough for the passage of the straight ends of brackets 8. The brackets are fixed to the horizontal flanges by bolts or the like. The brackets are in the nature of plates and have their outer ends bent at a right angle, as indicated by the numeral 9, and these ends are designed to be brought against one of the faces of blocks 10 which are welded or otherwise secured to the scraper blades 12.

The blocks 10 are provided with elongated longitudinally arranged slots 14 and the flat portions or ears 9 on the brackets 8 have passed therethrough and through the slots 14 bolts 15 which are engaged by nuts 16 or other method of holding blades 12 in set position may be used. It will be apparent that by this arrangement the scraper blades 12 may be bodily adjusted vertically with respect to the tooth carrying plates 1 and likewise that either end of the said scraper blades 12 may be arranged at a desired angle with respect to the tooth carrying plates. Further it will be noted that the blades 12 may swing upon their pivot bolts to allow the dirt to pass freely therebetween, when adjustment is loosened for that purpose.

Secured to the horizontal flanges of the tooth carrying plates adjacent to the front ends thereof there are blocks 16′ which may be integrally formed with or secured to the draft bar of the improvement. The draft bar comprises two plates 17 which extend toward each other from the blocks 16′ and which have their ends lapping and adjustably connected by removable means 18. Each of the sections of the draft bar has attached thereto a chain 19 which is hitched to the tractor, the cultivator or the draft animals.

The line of draft is indicated by the arrow in Figure 1 of the drawings and the teeth are arranged at an angle approximately at right angles to the hitch or draft and by arranging the series of angularly arranged teeth at outward angles on the substantially V-shaped frame no trash can be collected thereby. Also small truck cannot be gathered by the brackets 8, as they are arranged above the horizontal flanges of the members 1. The blades act upon the plowed ground to smooth and level the same and to direct the earth toward the opening between the confronting ends of the blades while the teeth of the plates 1 act upon the earth to break and pulverize the same. Thus it will be noted that the implement answers the purpose of both a harrow and a drag and leaves the ground smooth yet pulverized which prevents packing should a rain follow the ground treating operation.

It will be noted to those skilled in the art to which the invention relates that the adjustment of the blades 12 permits of the implement meeting varying ground conditions, such as adjusting by lowering the point to cut ridges and move the dirt slowly back towards the center or to tilt to allow the dirt to pass more freely and it is thought that the construction and advantages of the improvement will be understood and appreciated by those skilled in the art without further detailed description.

Having described the invention, I claim:

1. In an implement for the purpose set forth, angularly arranged tooth carrying plates, a link pivotally securing the rear ends of the plates, blades parallel with and spaced from the inner edges of the plates, means for pivotally and adjustably connecting the blades to the plates and a draft bar comprising two adjustably connected sections whose ends are secured to the plates.

2. An implement for the purpose set forth, comprising a pair of bars arranged at opposite angles with respect to each other whereby the bars are substantially V-shaped in plan, a link connecting and spacing the confronting ends of the bars, each bar having a series of angle openings, a tooth passing through each opening, clamping means on the bar through which the teeth pass for holding the teeth adjusted with respect to the bar, a scraper blade secured for swinging and for vertical adjustment to but spaced from the inner face of each bar, a draw bar having its ends fixed to the tooth carrying bar and comprising lapping sections and means for adjustably connecting the sections.

3. An implement for the purpose set forth, comprising angle bars arranged at opposite angles with respect to each other whereby the bars are substantially V-shaped in plan, a link connecting and spacing the confronting ends of the bars, said bars having their horizontal flanges provided with equidistantly spaced openings whose walls are disposed at inward angles, a disc having a slitted end pivotally secured to the said bars opposite each of the said openings, pins passing through the discs and through the openings in the bars, adjustable means for compressing the split ends of the discs for compressing the discs around the pins, a scraper blade swingably and vertically adjustably secured to each of the tooth carrying bars but spaced from the inner faces thereof, a draw bar having its ends fixed to the tooth carrying bars, said draw bar comprising lapping members and means for adjustably connecting the members.

4. An implement for the purpose set forth comprising angle bars arranged at opposite angles with respect to each other whereby the bars are substantially V-shaped in plan, a link connecting but spacing the confronting ends of the bars, said bars having their horizontal flanges provided with equidistantly spaced openings whose walls are disposed at angles, a washer pivotally secured to said bars and opposite each of the said openings, and the openings in the washers alining with those in the bars and each washer having a split end, pins passing through the washers and through the openings in the bars, adjustable means for compressing the split ends of the washers for compressing the washers against the pins and for holding the pins adjusted, a scraper blade hingedly secured to the respective tooth carrying bars but spaced from the inner faces thereof, said hinges comprising plates which are fixed to the tooth carrying bars and blocks which are fixed to the vertical flanges of the scraper blades, the said blocks being provided with elongated openings and bolts passing through these openings and through the fixed plates, a draw bar having its ends fixed to the tooth carrying bars and overlying the scraper blades, said draw bar comprising lapping members and means for adjustably connecting the members.

In testimony whereof I affix my signature.

RAYMOND E. SWANFELT.